(12) United States Patent
Lee

(10) Patent No.: US 6,554,341 B2
(45) Date of Patent: Apr. 29, 2003

(54) FENDER PANEL IMPACT ABSORPTION STRUCTURE OF VEHICLE HAVING PEDESTRIAN PROTECTION FUNCTION

(75) Inventor: Wan-Young Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/983,316

(22) Filed: Oct. 24, 2001

(65) Prior Publication Data

US 2002/0063443 A1 May 30, 2002

(30) Foreign Application Priority Data

Nov. 30, 2000 (KR) .................................... 2000-72072

(51) Int. Cl.[7] .......................... B62D 27/00; B62D 29/00
(52) U.S. Cl. ...................................................... 296/29
(58) Field of Search ............................................ 296/29

(56) References Cited

U.S. PATENT DOCUMENTS

2002/0060474 A1 * 5/2002 Chung

* cited by examiner

Primary Examiner—D. Glenn Dayoan
Assistant Examiner—Scott Carpenter
(74) Attorney, Agent, or Firm—Birch, Stewart, Kolasch & Birch, LLP

(57) ABSTRACT

The present invention relates to a fender panel impact absorption structure having a pedestrian protection function in which an impact absorption unit is installed between a fender panel and the top of an fender shield panel to secure space enough to absorb the impact energy to the maximum level and minimize a pedestrian's injury when the pedestrian is bumped to the fender panel, the structure being constructed by fastening together the end of a bent part of a fender panel positioned under a hood panel and the top of an fender shield panel with at least more than 2 impact absorption units positioned between the lower side of the bent part of the fender panel and the upper side of the fender shield panel along the upper surface of the fender shield panel in a predetermined interval.

1 Claim, 5 Drawing Sheets

FENDER PANEL IMPACT ABSORPTION STRUCTURE OF VEHICLE HAVING PEDESTRIAN PROTECTION FUNCTION

BACKGROUND OF THE INVENTION

1. Field of the Invention

The present invention relates to a fender panel impact absorption structure of vehicle having a pedestrian protection function and more particularly to a fender panel impact absorption structure having a pedestrian protection function in which impact absorption units are installed between a fender panel and a top of a fender shield panel to absorb impact to the fender panel and to minimize a pedestrian's injury when the impact is made to a pedestrian.

2. Description of the Invention

In general, a space should be secured to enable hood panel or fender panel to be elastically deformed in the event that a pedestrian gets bumped to a vehicle. Like with the aforementioned space, it is the most important to design a vehicle to minimize a pedestrian's injury by enabling an impact to a pedestrian to be absorbed to the maximum extent.

The fender panel impact absorption structure for playing the important role as such is constructed in a structure in which, as shown in FIGS. 1 and 2, a lower surface of a bent part 11 of a fender panel 10 is placed on the upper surface of a fender shield panel 20, and the bent part 11 of the fender panel 10 and the fender shield panel 20 are penetrated and fixed with bolts 21.

However, since the fender shield panel 20 and the fender panel 10 is very firmly fastened, there has been a problem that they do not absorb the impact energy much in the event of a crash to a pedestrian, only to increase the degree of his or her injury.

Besides, there has been another problem in the conventional structure where the bent part 11 of a fender panel 10 is fastened on the upper surface of the fender shield panel 20 with bolts 21 in that the fender panel 10 and hood panel 40 cannot be deformed much enough by the crash to a pedestrian because the gap between the upper part of the fender shield panel 20 and the fender panel 10 is very narrow, but a relatively great deal of impact energy is transmitted, resulting in more severe injury to the pedestrian.

SUMMARY OF THE INVENTION

It is an object of the present invention to solve the aforementioned problems and provide a fender panel impact absorption structure having a pedestrian protection function by installing an impact absorption unit between fender panel and the top of fender shield panel to secure a sufficient size of space between the fender panel and fender shield panel to absorb the impact energy to the maximum level and minimize a pedestrian's injury when the pedestrian is bumped to the fender panel.

In order to accomplish the aforementioned object of the present invention, there is provided a fender panel impact absorption structure having a pedestrian protection function constructed by fastening together an end of a bent part of a fender panel positioned under a hood panel and a top of an fender shield panel with at least more than 2 impact absorption units positioned between a lower side of the bent part of the fender panel and an upper side of the fender shield panel along an upper surface of the fender shield-panel in a predetermined interval.

In addition, the impact absorption unit is shaped with extension parts to be welded to the upper surface of the fender shield panel, a top surface to be fastened with the lower surface of the bent part of the fender-panel and bent parts formed at the both center between the top surface and extension parts to absorb impact.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, a preferred embodiment of the present invention will be described in detail with reference to accompanying drawings.

Figure 1:
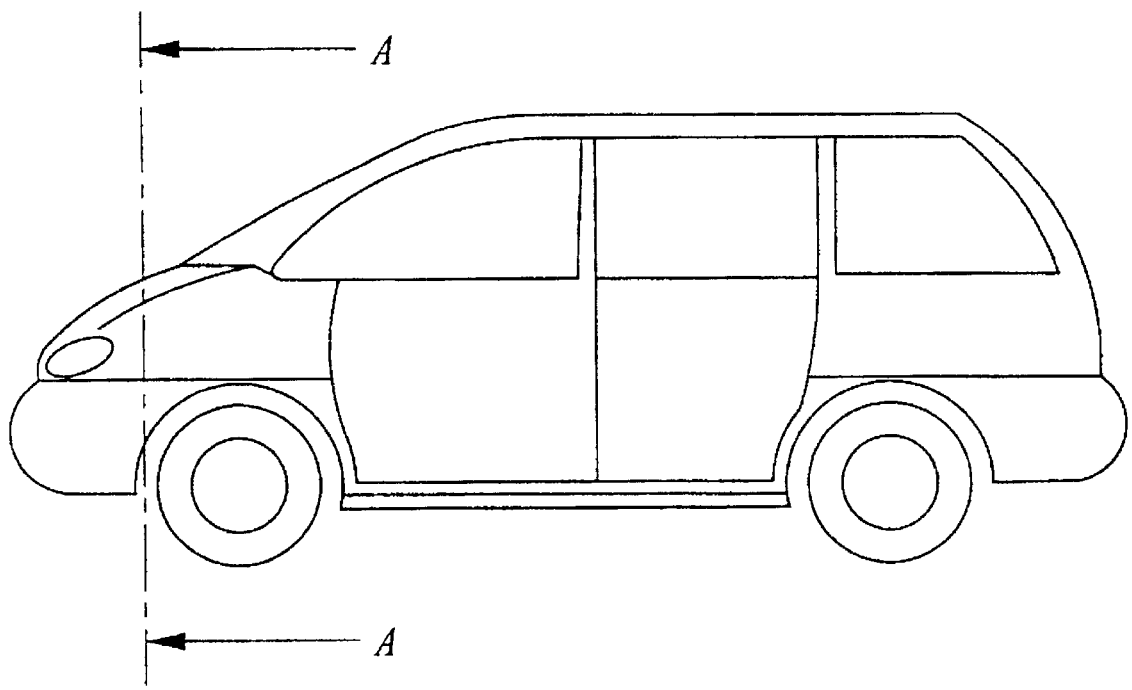
FIG. 1 is a lateral view of a general vehicle.
Figure 2:
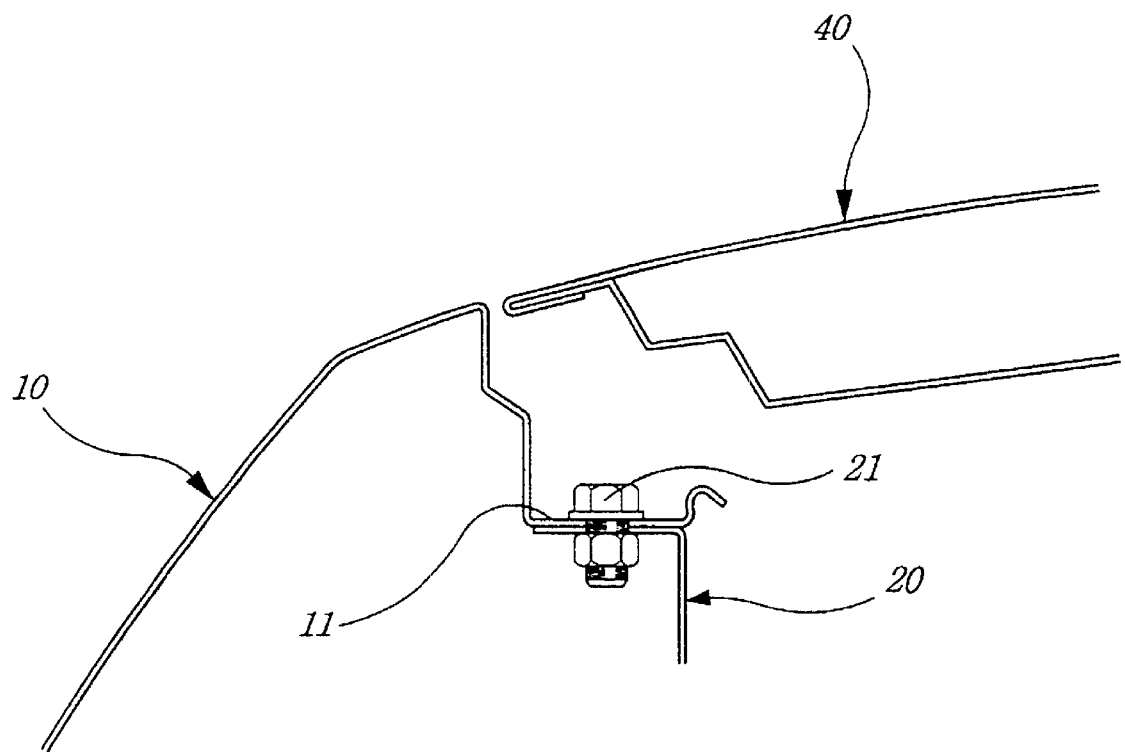
FIG. 2 is a cross-sectional view cut along line A-A in FIG. 2 for illustrating a conventional fender panel impact absorption structure of a vehicle having a pedestrian protection function.
Figure 3:
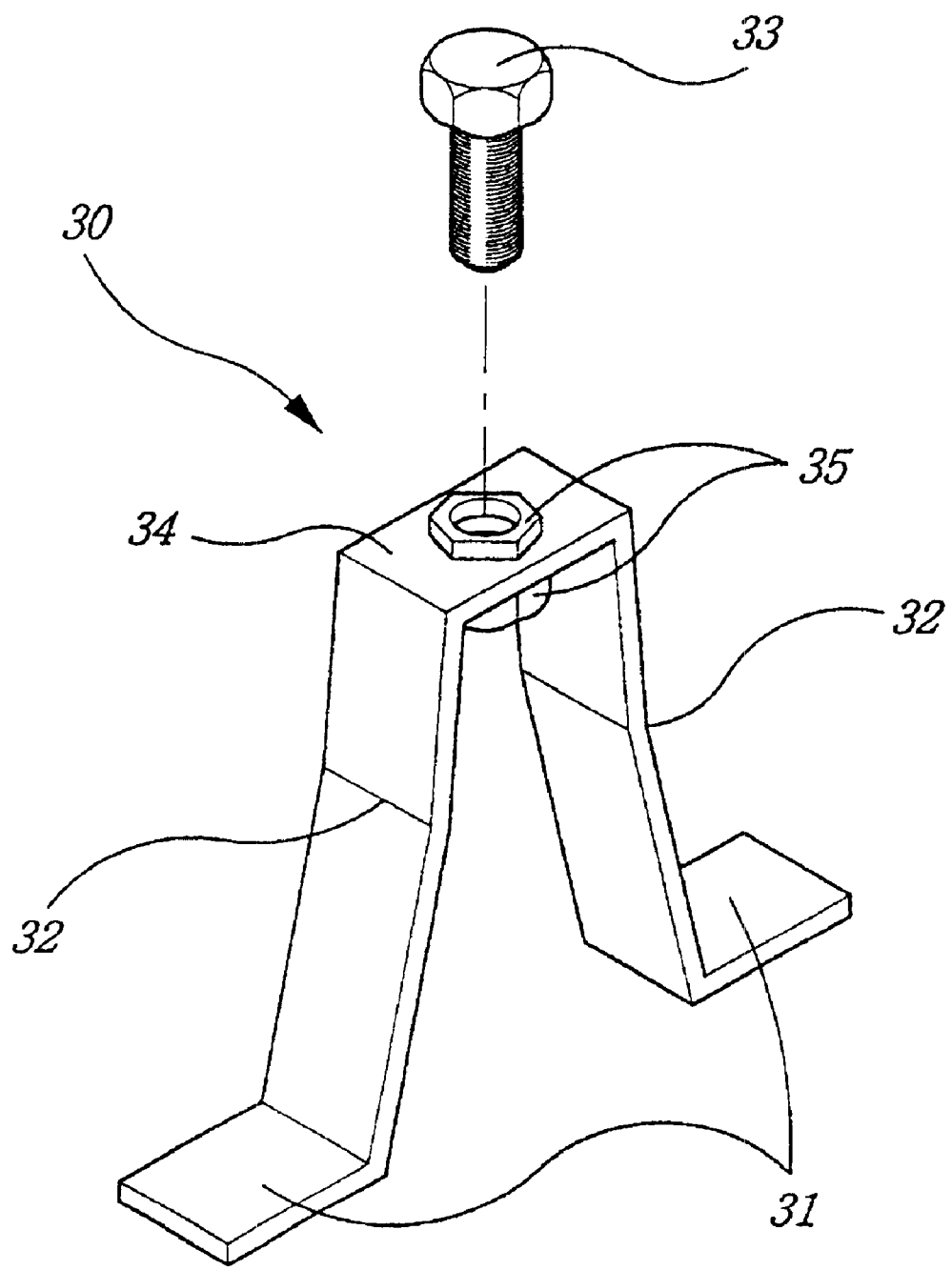
FIG. 3 is a perspective view for illustrating a fender panel impact absorption unit of a vehicle having a pedestrian protection function in accordance with the present invention.
Figure 4:
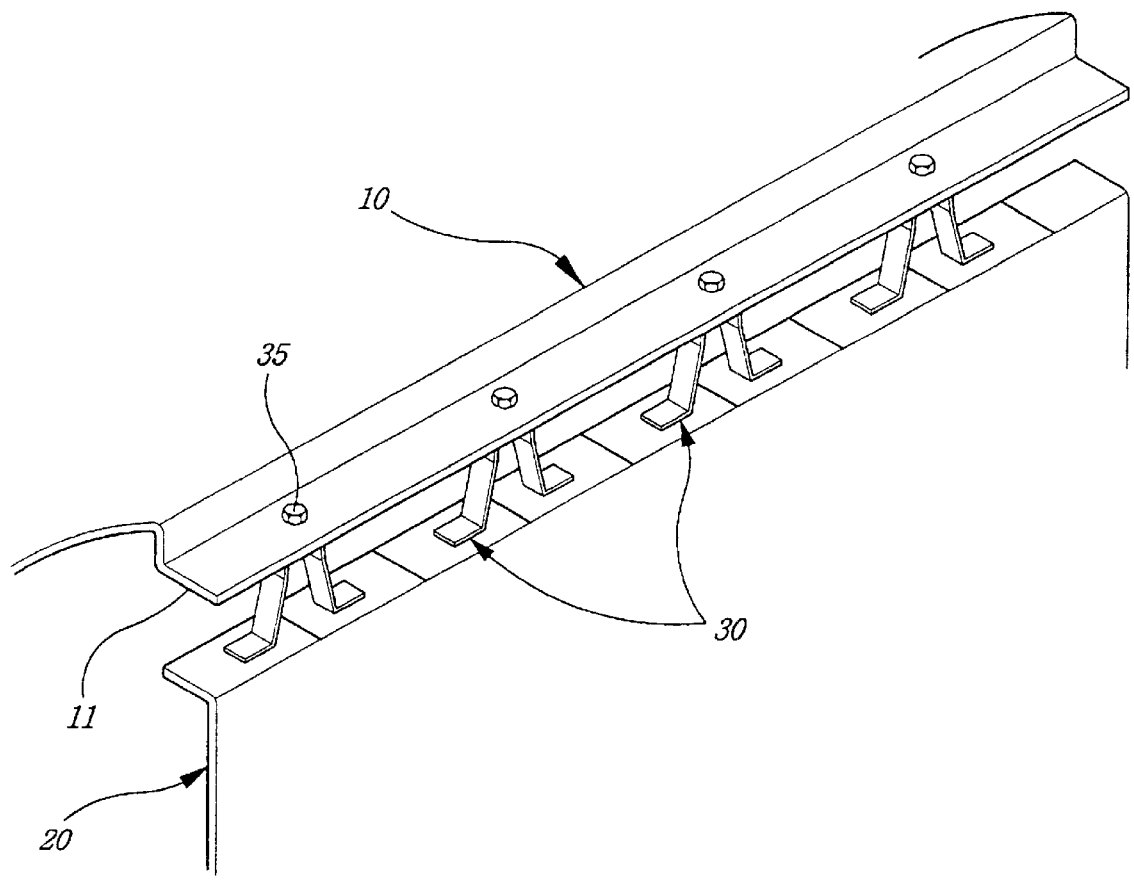
FIG. 4 is a perspective view for illustrating a state of a fender panel impact absorption structure having a pedestrian protection function in which impact absorption units are applied to a fender panel of a vehicle in accordance with the present invention.
Figure 5:
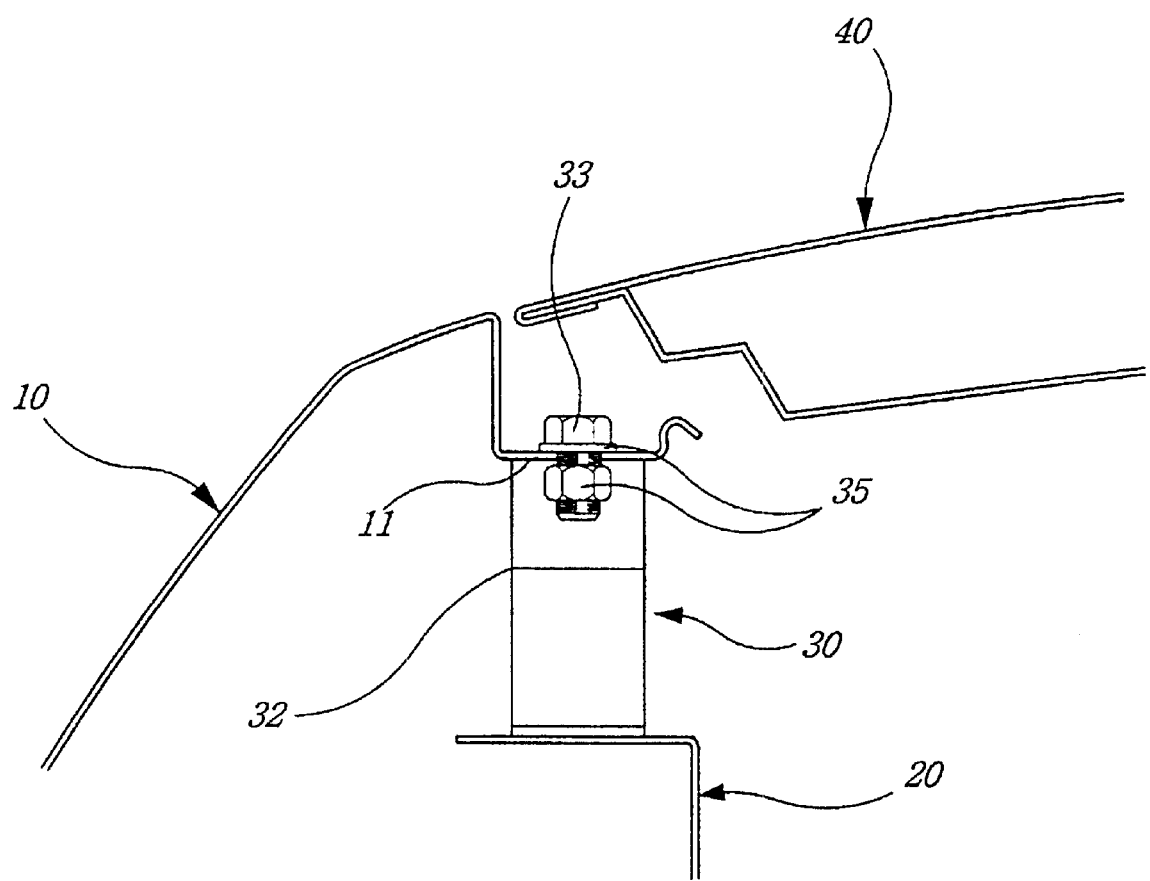
FIG. 5 is a partial cross-sectional view for illustrating an installation state of a fender panel impact absorption structure having a pedestrian protection function in which impact absorption units are applied to a fender panel of a vehicle in accordance with the present invention.

FIG. 3 is a perspective view for illustrating a fender panel impact absorption unit of a vehicle having a pedestrian protection function in accordance with the present invention. FIG. 4 is a perspective view for illustrating a state of a fender panel impact absorption structure having a pedestrian protection function in which impact absorption units are applied to a fender panel of a vehicle in accordance with the present invention. FIG. 5 is a partial cross-sectional view for illustrating an installation state of a fender panel impact absorption structure having a pedestrian protection function in which impact absorption units are applied to a fender panel of a vehicle in accordance with the present invention.

As shown in FIGS. 3 through 5, the fender panel impact absorption structure of a car (C) is constructed with an impact absorption unit 30 by fastening a bottom of a bent part 11 of a fender panel 10 positioned under a hood panel 50 and a top of an fender shield panel 20.

In other words, bolts are used for fastening the bottom of the bent part 11 of the fender panel 10 and the top of the impact absorption unit 30. A bolt hole 34 is formed at the center of the top of the impact absorption unit 30. Nuts are welded at both end surfaces of the bolt hole 34. As a result, the bolts can be firmly fastened with the nuts 35.

In addition, the lower portion of the impact absorption unit 30 is bent and extended in perpendicular to both lateral sides of the impact absorption unit 30, thus being formed into extension parts 31 to be welded with the upper surface of the fender shield panel 20.

On the other hand, when a pedestrian is bumped to the fender panel 10 and hood panel 40, the impact energy is transmitted to the impact absorption unit 30 installed between the bottom of the bent part 11 of the fender panel 10 and the top of the fender shield panel 20, and the bent part 32 formed in the middle of the impact absorption unit 30 absorbs and exhausts the impact energy.

In addition, if the impact energy exceeds a predetermined level, the impact absorption unit 30 installed between the bottom of the bent part 11 of the fender panel 10 and the top of the fender shield panel 20 is deformed around the bent part 32 to absorb greater amount of impact energy.

Furthermore, the impact absorption unit 30 of the present invention contains a predetermined level of elasticity, so that it can support the fender panel 10 and buffer impact when the impact is applied to the fender panel 10 and then pushed toward the car body.

As described above, there is an advantage in the fender panel impact absorption structure having a pedestrian protection function of the present invention in that the impact absorption unit is installed between the fender panel and the top of the fender shield panel to secure a space enough to absorb the impact energy to the maximum level and minimize a pedestrian's injury when the pedestrian is bumped to the fender panel.

In addition, there is another advantage in the fender panel impact absorption structure having a pedestrian protection function of the present invention in that the bent parts are formed at the both center portions of the impact absorption unit to absorb the impact energy and minimize a pedestrian's injury when the pedestrian is bumped to the fender panel.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fender panel impact absorption structure having a pedestrian protection function constructed by fastening together an end of a bent part of a fender panel positioned under a hood panel and a top of a fender shield panel; the structure comprising at least two impact absorption units positioned between a lower surface of the bent part of the fender panel and an upper surface of the fender shield panel in a predetermined interval, wherein each of the at least two impact absorption units includes a top part securable to the lower surface of the bent part of the fender panel, a pair of legs extending generally downward from opposite lateral sides of the top part of each of the impact absorption units and wherein each of the legs is formed with a bent part at the center, and extension parts extending from the lower end of each of the legs to be welded to the upper surface of the fender shield panel.

* * * * *